(12) United States Patent
Davies et al.

(10) Patent No.: US 12,612,154 B2
(45) Date of Patent: Apr. 28, 2026

(54) MECHANICAL ARCHITECTURE FOR DISTRIBUTED FLAP ACTUATION SYSTEM

(71) Applicant: Goodrich Actuation Systems Limited, Wolverhampton (GB)

(72) Inventors: Stephen Harlow Davies, Shrewsbury (GB); Rajasekaran Janakiraman, Karnataka (IN); John Alexander Ethelston Derry, Burton on Trent (GB); Jayantha Hunisebailu, Karnataka (IN); Subrahmanyam Veerarapu, Karnataka (IN)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 0 days.

(21) Appl. No.: 19/057,341

(22) Filed: Feb. 19, 2025

(65) Prior Publication Data

US 2025/0289564 A1      Sep. 18, 2025

(30) Foreign Application Priority Data

Mar. 14, 2024    (IN)  .............................. 202411018678

(51) Int. Cl.
B64C 13/34          (2006.01)
B64C 13/50          (2006.01)
(52) U.S. Cl.
CPC ............ *B64C 13/34* (2013.01); *B64C 13/505* (2018.01)

(58) Field of Classification Search
CPC ...... B64C 13/34; B64C 13/505; B64C 13/341
See application file for complete search history.

(56) References Cited

U.S. PATENT DOCUMENTS

| | | | |
|---|---|---|---|
| 4,721,016 | A | 1/1988 | Burandt |
| 4,979,700 | A | 12/1990 | Tiedeman et al. |
| 5,120,285 | A | 6/1992 | Grimm |
| 7,031,810 | B2 | 4/2006 | Foch et al. |
| 8,814,101 | B2 | 8/2014 | Hetrick et al. |
| 9,376,204 | B2 | 6/2016 | Winkelmann |
| 9,434,469 | B2 | 9/2016 | Zantz et al. |
| 9,531,238 | B2 | 12/2016 | Bugge |
| 10,829,203 | B2 | 11/2020 | Huynh |
| 11,060,593 | B2 | 7/2021 | Veilleux, Jr. et al. |
| 11,111,005 | B2 | 9/2021 | Harrington et al. |
| 11,242,131 | B2 | 2/2022 | Tzabari |

(Continued)

*Primary Examiner* — Rodney A Bonnette
(74) *Attorney, Agent, or Firm* — CANTOR COLBURN LLP

(57)                    ABSTRACT

A mechanical architecture is provided for aircraft distributed flap actuation and includes a shaft and first and second actuation units. The first actuation unit includes a motor, a first actuator for translating and rotating a flap and being connected to a first side of the flap, a first gearbox to transfer and increase torque from the motor to the first actuator and a first brake configured to hold the flap in place. The second actuation unit includes a second actuator that receives the torque from the first gearbox via the shaft for translating and rotating the flap and being connected to a second side of the flap, a second gearbox that receives the torque from the first gearbox via the shaft and reduces the torque and a second brake receptive of the torque from the second gearbox and configured to hold the flap in place through the second actuator.

17 Claims, 4 Drawing Sheets

(56) References Cited

U.S. PATENT DOCUMENTS

| | | | |
|---|---|---|---|
| 11,286,040 B2 | 3/2022 | Morgan | |
| 11,383,824 B2 | 7/2022 | Vadlejch et al. | |
| 11,603,185 B2 | 3/2023 | Polcuch et al. | |
| 11,897,611 B2 | 2/2024 | Huynh | |
| 12,269,582 B1 * | 4/2025 | Kopecek | F16H 3/54 |
| 2006/0144996 A1 * | 7/2006 | Carl | B64C 13/341 |
| | | | 244/99.2 |
| 2006/0255207 A1 | 11/2006 | Wingett et al. | |
| 2020/0079498 A1 * | 3/2020 | Mercier | B64C 13/34 |
| 2020/0156766 A1 | 5/2020 | Tzabari | |
| 2020/0198769 A1 * | 6/2020 | Miyazono | B64C 13/50 |
| 2025/0146563 A1 * | 5/2025 | Potier | B64C 13/50 |

* cited by examiner

MECHANICAL ARCHITECTURE FOR DISTRIBUTED FLAP ACTUATION SYSTEM

CROSS-REFERENCE TO RELATED APPLICATIONS

This application claims the benefit of Indian Patent Application No. 202411018678 filed Mar. 14, 2024, the disclosure of which is incorporated herein by reference in its entirety.

BACKGROUND

The present disclosure relates to aircraft and, more particularly, to a mechanical architecture for a distributed flap actuation system.

In aeronautics, aircraft include fuselage with aerodynamic wings extending outwardly from either side of the fuselage. Flight control surfaces, such as flaps are provided on each of the wings. Often, there are two flaps for each wing. The flaps translate and rotate upwardly and downwardly to provide increased lift during certain flight regimes. The translating and rotating of the flaps can be actuated by sets of actuators for each flap.

BRIEF DESCRIPTION

According to an aspect of the disclosure, a mechanical architecture is provided for a distributed flap actuation system of an aircraft. The mechanical architecture includes a shaft, a first actuation unit and a second actuation unit. The first actuation unit includes a motor, a first actuator for translating and rotating a flap and being connected to a first side of the flap, a first gearbox to transfer and increase torque from the motor to the first actuator and a first brake configured to hold the flap in place. The second actuation unit includes a second actuator that receives the torque from the first gearbox via the shaft for translating and rotating the flap and being connected to a second side of the flap, a second gearbox that receives the torque from the first gearbox via the shaft and reduces the torque and a second brake receptive of the torque from the second gearbox and configured to hold the flap in place through the second actuator.

In accordance with additional or alternative embodiments, the motor includes a dual channel motor.

In accordance with additional or alternative embodiments, at least one of the first actuator and the second actuator includes an elongate member, a multi-stage epicycle gearbox and an output shaft operably interposed between the elongate member and the multi-stage epicycle gearbox.

In accordance with additional or alternative embodiments, at least one of the first gearbox and the second gearbox includes a spur/epicyclic gear train.

In accordance with additional or alternative embodiments, at least one of the first gearbox transfers increased torque from the motor to the first actuator and the second gearbox receives a same torque from the first gearbox via the shaft for driving the second actuator, interfaces with the second brake and reduces the same torque.

In accordance with additional or alternative embodiments, the first brake is coupled to the motor and the second brake is coupled to the second gearbox and the first brake and the second brake have same or different brake capacities.

According to an aspect of the disclosure, a distributed flap actuation system to control translation and rotation of a flap of an aircraft wing is provided. The distributed flap actuation system includes a mechanical architecture. The mechanical architecture includes a shaft, a first actuation unit and a second actuation unit. The first actuation unit includes a dual channel motor receptive of electricity from first and second electrical system of the aircraft, a first actuator for translating and rotating the flap and being connected to a first side of the flap, a first gearbox to transfer and increase torque from the motor to the first actuator and a first brake for holding the flap in place. The second actuation unit includes a second actuator that receives the torque from the first gearbox via the shaft for translating and rotating the flap and being connected to a second side of the flap, a second gearbox that receives the torque from the first gearbox via the shaft and reduces the torque and a second brake receptive of the torque from the second gearbox for holding the flap in place through the second actuator.

In accordance with additional or alternative embodiments, at least one of the first actuator and the second actuator includes an elongate member, a multi-stage epicycle gearbox and an output shaft operably interposed between the elongate member and the multi-stage epicycle gearbox and at least one of the first gearbox and the second gearbox includes a spur/epicyclic gear train.

In accordance with additional or alternative embodiments, at least one of the first gearbox transfers increased torque from the motor to the first actuator and the second gearbox receives a same torque from the first gearbox via the shaft for driving the second actuator, interfaces with the second brake and reduces the same torque.

In accordance with additional or alternative embodiments, the first brake is coupled to the motor and the second brake is coupled to the second gearbox and the first brake and the second brake have same or different brake capacities.

According to an aspect of the disclosure, an aircraft is provided and includes wings extending outwardly from either side of a fuselage, a flap disposed on each of the wings and a distributed flap actuation system to control translation and rotation of the flap disposed on each of the wings. The distributed flap actuation system for the flap disposed on each of the wings includes a mechanical architecture comprising common mechanical blocks (CMBs).

In accordance with additional or alternative embodiments, the aircraft is characterized as having an absence of a fuselage-mounted power drive unit (PDU) and a transmission system connected to the PDU and including torque tubes and joints for controlling the translation and rotation of the flap disposed on each of the wings.

In accordance with additional or alternative embodiments, the aircraft includes two upwardly and downwardly translatable and rotatable flaps disposed on the trailing edge of each of the wings.

In accordance with additional or alternative embodiments, the mechanical architecture for the distributed flap actuation system for the flap disposed on each of the wings includes a shaft, a first actuation unit including a motor, a first actuator for translating and rotating the flap and being connected to a first side of the flap, a first gearbox to transfer and increase torque from the motor to the first actuator and a first brake for holding the flap in place and a second actuation unit including a second actuator that receives the torque from the first gearbox via the shaft for translating and rotating the flap and being connected to a second side of the flap, a second gearbox that receives the torque from the first gearbox via the shaft and reduces the torque and a second brake receptive of the torque from the second gearbox and configured to hold the flap in place through the second actuator.

In accordance with additional or alternative embodiments, the motor of the first actuation unit includes a dual channel motor and the aircraft further includes first and second electrical systems for providing electricity to each channel of the dual channel motor.

In accordance with additional or alternative embodiments, at least one of the first actuator of the first actuation unit and the second actuator of the second actuation unit includes an elongate member, a multi-stage epicycle gearbox and an output shaft operably interposed between the elongate member and the multi-stage epicycle gearbox.

In accordance with additional or alternative embodiments, at least one of the first gearbox of the first actuation unit and the second gearbox of the second actuation unit includes a spur/epicyclic gear train.

In accordance with additional or alternative embodiments, at least one of the first gearbox transfers increased torque from the motor to the first actuator, and, and the second gearbox receives a same torque from the first gearbox via the shaft for driving the second actuator, interfaces with the second brake and reduces the same torque.

In accordance with additional or alternative embodiments, the first brake of the first actuation unit is coupled to the motor of the first actuation unit and the second brake of the second actuation unit is coupled to the second gearbox of the second actuation unit.

In accordance with additional or alternative embodiments, the first brake of the first actuation unit and the second brake of the second actuation unit have same or different brake capacities.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In aeronautics, aircraft include fuselage with a nose cone section, a tail section and aerodynamic wings extending outwardly from either side of the fuselage. Each wing is provided with flight control surfaces, such as flaps. Often, there are two flaps for each wing. The flaps are disposed on the trailing edges of the wings and are configured to translate and rotate upwardly and downwardly. The independent control of translating and rotating of the flaps provides for increased control during certain flight regimes. It is controlled manually by an electronic control box via flight control computer systems and/or a pilot.

The translating and rotating of the flaps can be actuated by sets of actuators for each flap. In conventional aircraft, a fuselage-mounted power drive unit (PDU) is provided within the fuselage to generate torque for causing the actuators to force the flaps to translate and rotate. The generated torque is transferred to the actuators via gearboxes, torque tubes and joints interleaved between adjacent torque tubes. The architecture formed by the PDU, the torque tubes, the gearboxes, the joints and the actuators is subject to certain failure modes and is heavy and complex.

Thus, as will be described below, a mechanical architecture is provided for a distributed flap actuation system for an aircraft. The mechanical architecture includes common mechanical blocks that constitute a highly modular approach with a minimal number of line replaceable units (LRUs).

Figure 1:
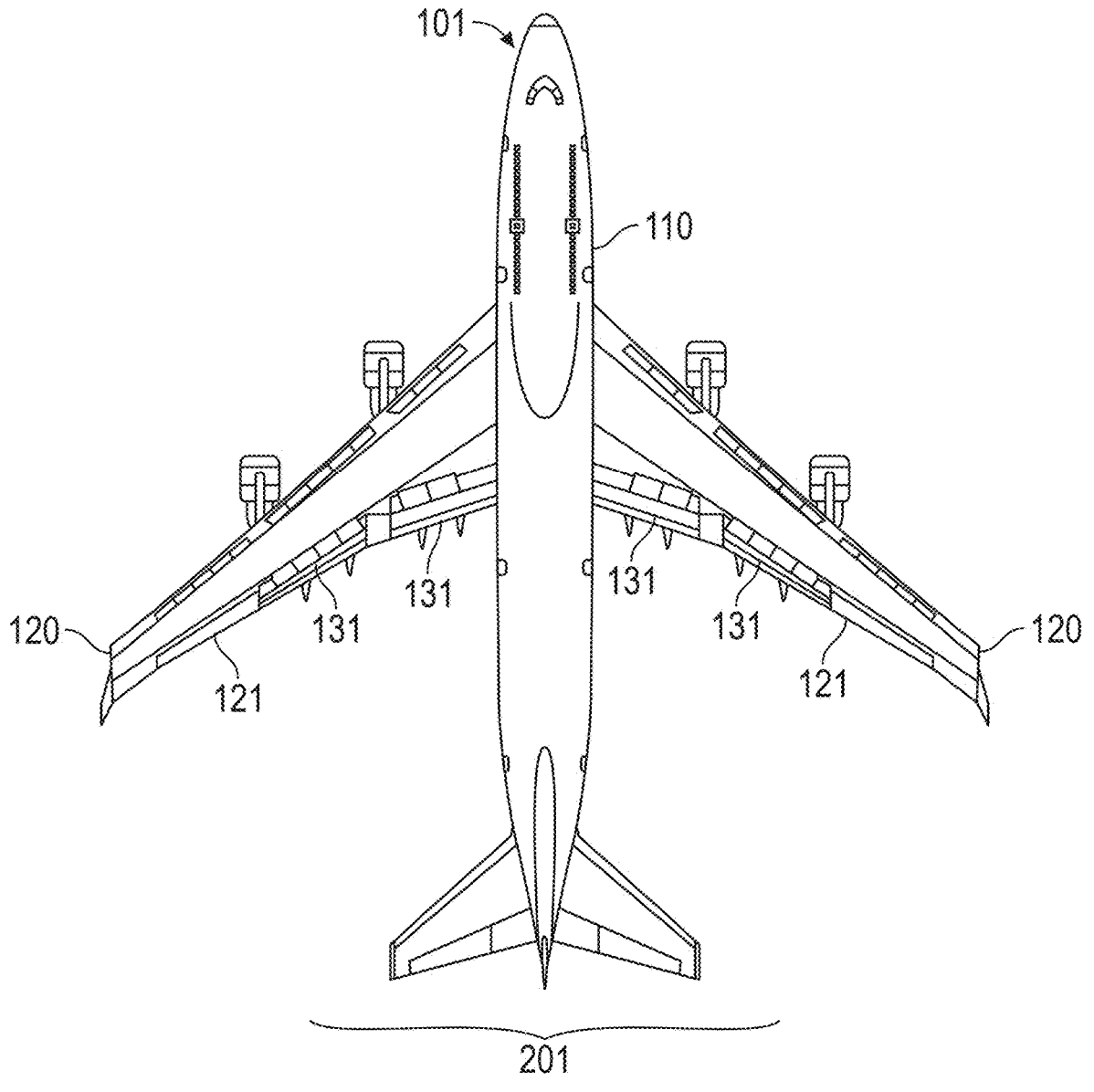
FIG. 1 is a top-down view of an aircraft with flaps in accordance with embodiments.

With reference to FIG. 1, an aircraft 101 is provided and includes a fuselage 110 with a nose cone section, a tail section and aerodynamic wings 120 extending outwardly from either side of the fuselage 110. Each wing 120 is provided with flight control surfaces, such as flaps 131. As shown in FIG. 1, there are two flaps 131 for each wing 120 though it is to be understood that a number of flaps 131 for each wing 120 can be greater or less than two. The flaps 131 are disposed on the trailing edges 121 of the wings 120 and are configured to translate and rotate in upward and downward directions. The translation and the rotation of the flaps 131 provides for increased lift/drag during certain flight regimes and is controllable manually by the pilots or automatically by flight control computer systems.

The following description will generally relate to the exemplary case in which the aircraft 101 has two upward and downwardly translatable and rotatable flaps 131 disposed on the trailing edges 121 of the wings 120. This is being done for purposes of clarity and brevity and should not be interpreted as limiting the disclosure or the following claims.

Figure 2:
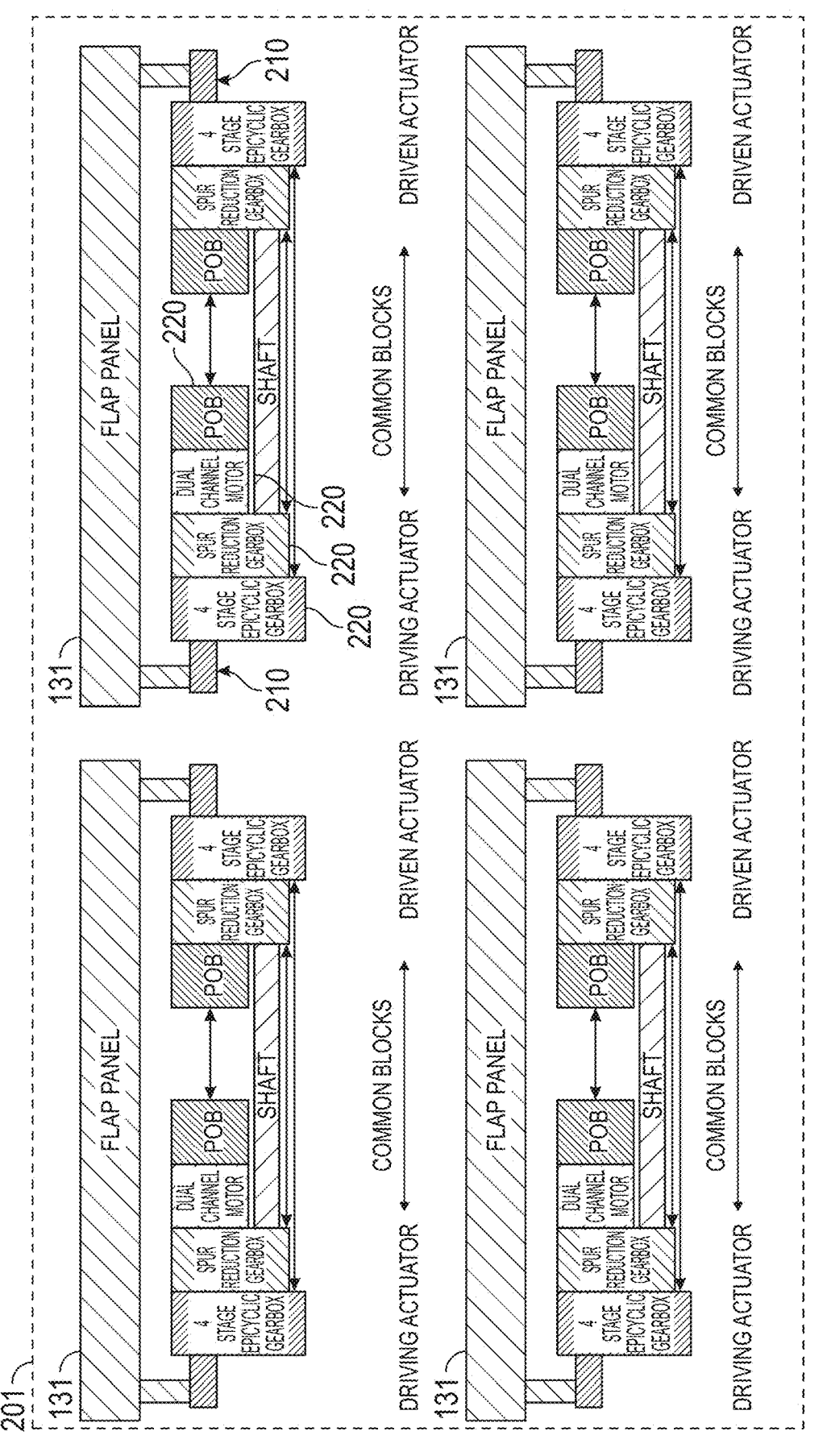
FIG. 2 is a schematic diagram of a distributed flap actuation system for the aircraft of FIG. 1 in accordance with embodiments.

With continued reference to FIG. 1 and with additional reference to FIG. 2, the aircraft 101 has a distributed flap actuation system 201 to control a translation and a rotation of the two upwardly and downwardly translatable and rotatable flaps 131 disposed on each of the wings 120. The distributed flap actuation system 201 for the two upwardly and downwardly translatable and rotatable flaps 131 disposed on each of the wings 120 includes a mechanical architecture 210 that in turn includes common mechanical blocks (CMBs) 220. In addition, the aircraft 101 can be characterized as having an absence of a fuselage-mounted PDU and transmission system connected to the PDU and including gearboxes, torque tubes and joints as found in aircraft with conventional flap actuation systems but the aircraft 101 is nevertheless fully functional for both ground-based and flight operations.

Figure 3:
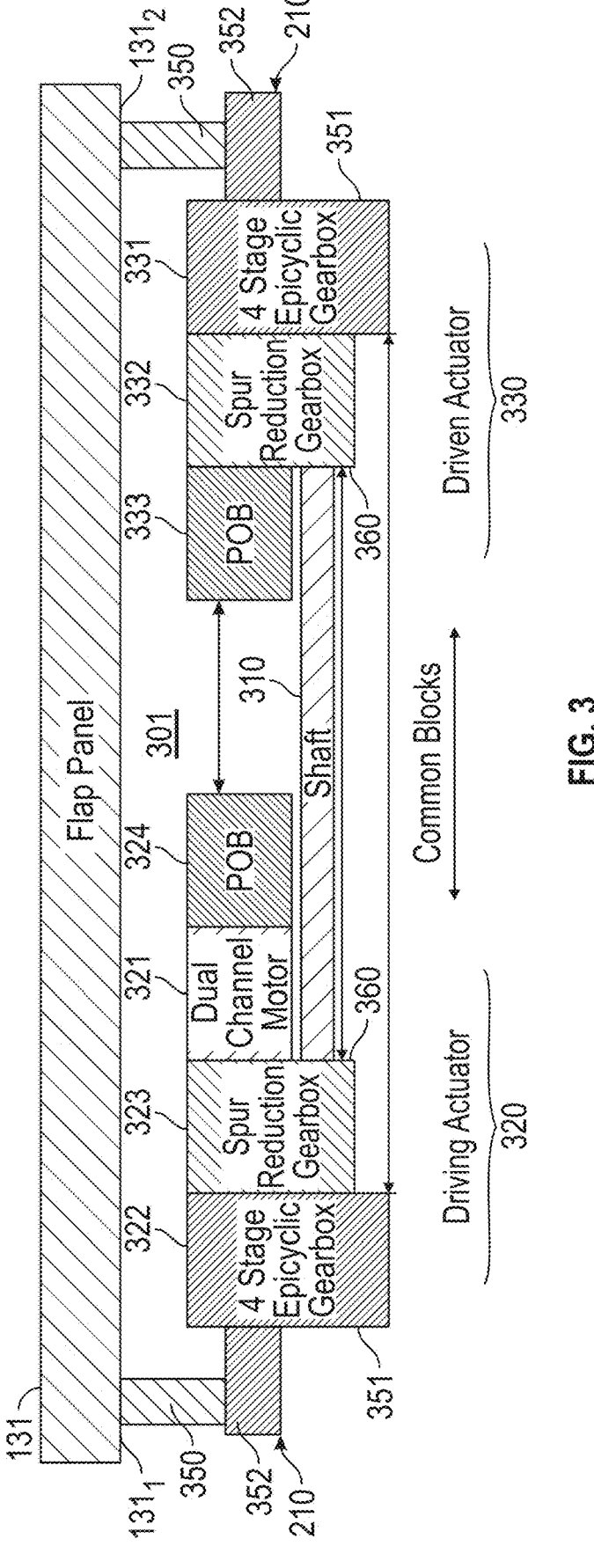
FIG. 3 is a schematic illustration of a mechanical architecture for the distributed flap actuation system of FIG. 2 in accordance with embodiments.
Figure 4:
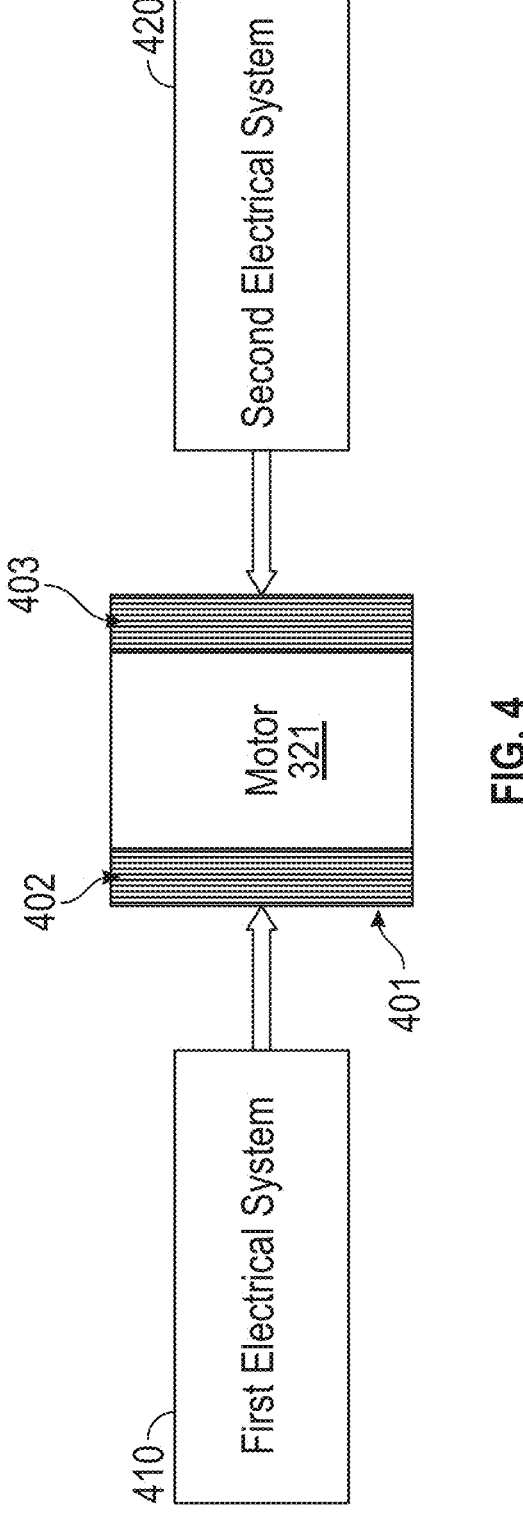
FIG. 4 is a schematic diagram illustrating an aircraft electrical system to support operations of the mechanical architecture of FIG. 3 in accordance with embodiments.

With continued reference to FIG. 2 and with additional reference to FIGS. 3 and 4, a mechanical architecture 301 is provided as the mechanical architecture 210 for the distributed flap actuation system 201 of FIG. 2. The mechanical architecture 301 includes, for each upwardly and downwardly translatable and rotatable flap 131, a shaft 310, a first actuation unit 320 and a second actuation unit 330. The first actuation unit 320 includes a motor 321, a first actuator 322 for translating and rotating the flap 131 and being connected to a first side $131_1$ of the flap 131, a first gearbox 323 to transfer increased torque from the motor 321 to the first actuator 322 and a first brake 324 configured to hold the flap 131 in place (i.e., to maintain a translation and rotation position of the flap 131). The second actuation unit 330 includes a second actuator 331 which receives torque from the first gearbox 323 via the shaft 310 for translating and rotating the flap 131 and being connected to a second side $131_2$ of the flap 131, a second gearbox 332 receptive of torque from the first gearbox 323 via the shaft 310 (or that taps the torque from the first gearbox 323 via the shaft 310) to transfer and/or reduce the torque from the shaft 310 to the second actuator 331 and a second brake 333 configured to hold the flap in place (i.e., to maintain a translation and rotation position of the flap 131) through the second actuator 331. The second brake 333 can receive torque from the second gearbox 332.

As shown in FIG. 4, the motor 321 of the first actuation unit 320 can include or be provided as a fault tolerant dual channel motor 401 with first and second channels 402 and 403 that each have a winding. In these or other cases, the aircraft 101 of FIG. 1 further includes first and second electrical systems 410 and 420 for providing electricity to each of the first and second channels 402 and 403. This provides for redundancy in an event that either of the first and second electrical systems 410 and 420 ceases to provide electricity. In such an event, the one of the first and second channels 402 and 403 that is receiving electricity is capable of generating sufficient torque on its own for powering operations of both the first actuation unit 320 and the second actuation unit 330.

As shown in FIG. 3, at least one of the first actuator 322 of the first actuation unit 320 and the second actuator 331 of the second actuation unit 330 can include an elongate member 350 connected to the flap 131 for mechanically forcing the flap 131 to translate and rotate, a multi-stage epicycle gearbox (i.e., an actuator) 351 and an output shaft 352 that is operably interposed between the elongate member 350 and the multi-stage epicycle gearbox 351. At least one of the first gearbox 323 of the first actuation unit 320 and the second gearbox 332 of the second actuation unit 330 can include a spur/epicyclic gear train 360 that is configured to reduce an input rotational speed from the motor 321 to a rotational speed that is usable by the corresponding multi-stage epicyclic gearbox 351.

At least one of the first gearbox 323 of the first actuation unit 320 can transfer first gear-increased torque from the motor 321 of the first actuation unit 320 to the first actuator 322 of the first actuation unit 320 and the second gearbox 332 of the second actuation unit 330 transfers a same torque from the shaft 310 to the second actuator 331 of the second actuation unit 330 and also gear-reduced torque from the shaft 310 to the second brake 333.

As further shown in FIG. 3, the first brake 324 of the first actuation unit 320 can be coupled to either of the motor 321 or the first gearbox 323 of the first actuation unit 320 and the second brake 333 of the second actuation unit 330 can be coupled to the second gearbox 332 of the second actuation unit 330. In this way, the first brake 324 of the first actuation unit 320 and the second brake 333 of the second actuation unit 330 can have same or, in some limited cases, different brake capacities.

Technical effects and benefits of the present disclosure are the provision of a mechanical architecture for a distributed flap actuation system for an aircraft that includes CMBs. Each CMB is designed from first principals to address known boundary conditions of legacy technology high-lift systems, specifically gearbox efficiencies, gearbox drag, brake drag, etc.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A mechanical architecture for a distributed flap actuation system of an aircraft, the mechanical architecture comprising:
   a shaft;
   a first actuation unit comprising a motor, a first actuator for translating and rotating a flap and being connected to a first side of the flap, a first gearbox to transfer and increase torque from the motor to the first actuator and a first brake configured to hold the flap in place, and
   a second actuation unit comprising a second actuator that receives the torque from the first gearbox via the shaft for translating and rotating the flap and being connected to a second side of the flap, a second gearbox that receives the torque from the first gearbox via the shaft and reduces the torque and a second brake receptive of the torque from the second gearbox and configured to hold the flap in place through the second actuator.

2. The mechanical architecture according to claim 1, wherein the motor comprises a dual channel motor.

3. The mechanical architecture according to claim 1, wherein at least one of the first actuator and the second actuator comprises an elongate member, a multi-stage epicycle gearbox and an output shaft operably interposed between the elongate member and the multi-stage epicycle gearbox.

4. The mechanical architecture according to claim 1, wherein at least one of the first gearbox and the second gearbox comprises a spur/epicycle gear train.

5. The mechanical architecture according to claim 1, wherein at least one of:
   the first gearbox transfers increased torque from the motor to the first actuator, and
   the second gearbox receives a same torque from the first gearbox via the shaft for driving the second actuator, interfaces with the second brake and reduces the same torque.

6. The mechanical architecture according to claim 1, wherein the first brake is coupled to the motor and the second brake is coupled to the second gearbox and the first brake and the second brake have same or different brake capacities.

7. A distributed flap actuation system to control translation and rotation of a flap of an aircraft wing, the distributed flap actuation system comprising:

a mechanical architecture comprising:

a shaft;

a first actuation unit comprising a dual channel motor receptive of electricity from first and second electrical system of the aircraft, a first actuator for translating and rotating the flap and being connected to a first side of the flap, a first gearbox to transfer and increase torque from the motor to the first actuator and a first brake for holding the flap in place, and a second actuation unit comprising a second actuator that receives the torque from the first gearbox via the shaft for translating and rotating the flap and being connected to a second side of the flap, a second gearbox that receives the torque from the first gearbox via the shaft and reduces the torque and a second brake receptive of the torque from the second gearbox for holding the flap in place through the second actuator.

8. The distributed flap actuation system according to claim 7, wherein:

at least one of the first actuator and the second actuator comprises an elongate member, a multi-stage epicycle gearbox and an output shaft operably interposed between the elongate member and the multi-stage epicycle gearbox, and at least one of the first gearbox and the second gearbox comprises a spur reduction gear.

9. The distributed flap actuation system according to claim 7, wherein at least one of:

the first gearbox transfers increased torque from the motor to the first actuator, and the second gearbox receives a same torque from the first gearbox via the shaft for driving the second actuator, interfaces with the second brake and reduces the same torque.

10. The distributed flap actuation system according to claim 7, wherein the first brake is coupled to the motor and the second brake is coupled to the second gearbox and the first brake and the second brake have same or different brake capacities.

11. An aircraft, comprising:

wings extending outwardly from either side of a fuselage;

a flap disposed on each of the wings; and a distributed flap actuation system to control translation and rotation of the flap disposed on each of the wings, the distributed flap actuation system for the flap disposed on each of the wings comprising a mechanical architecture comprising common mechanical blocks (CMBs), said CMBs further comprising:

a shaft;

a first actuation unit comprising a motor, a first actuator for translating and rotating the flap and being connected to a first side of the flap, a first gearbox to transfer and increase torque from the motor to the first actuator and a first brake for holding the flap in place, and a second actuation unit comprising a second actuator that receives the torque from the first gearbox via the shaft for translating and rotating the flap and being connected to a second side of the flap, a second gearbox that receives the torque from the first gearbox via the shaft and reduces the torque and a second brake receptive of the torque from the second gearbox and configured to hold the flap in place through the second actuator.

12. The aircraft according to claim 11, wherein:

the motor of the first actuation unit comprises a dual channel motor; and the aircraft further comprises first and second electrical systems for providing electricity to each channel of the dual channel motor.

13. The aircraft according to claim 11, wherein at least one of the first actuator of the first actuation unit and the second actuator of the second actuation unit comprises:

an elongate member;

a multi-stage epicycle gearbox; and an output shaft operably interposed between the elongate member and the multi-stage epicycle gearbox.

14. The aircraft according to claim 11, wherein at least one of the first gearbox of the first actuation unit and the second gearbox of the second actuation unit comprises a spur/epicyclic gear train.

15. The aircraft according to claim 11, wherein at least one of:

the first gearbox transfers increased torque from the motor to the first actuator, and, and the second gearbox receives a same torque from the first gearbox via the shaft for driving the second actuator, interfaces with the second brake and reduces the same torque.

16. The aircraft according to claim 11, wherein the first brake of the first actuation unit is coupled to the motor of the first actuation unit and the second brake of the second actuation unit is coupled to the second gearbox of the second actuation unit.

17. The aircraft according to claim 11, wherein the first brake of the first actuation unit and the second brake of the second actuation unit have same or different brake capacities.

* * * * *